March 10, 1931. J. COLETTI 1,795,329
FACIAL SPRAY DEVICE
Filed March 18, 1930
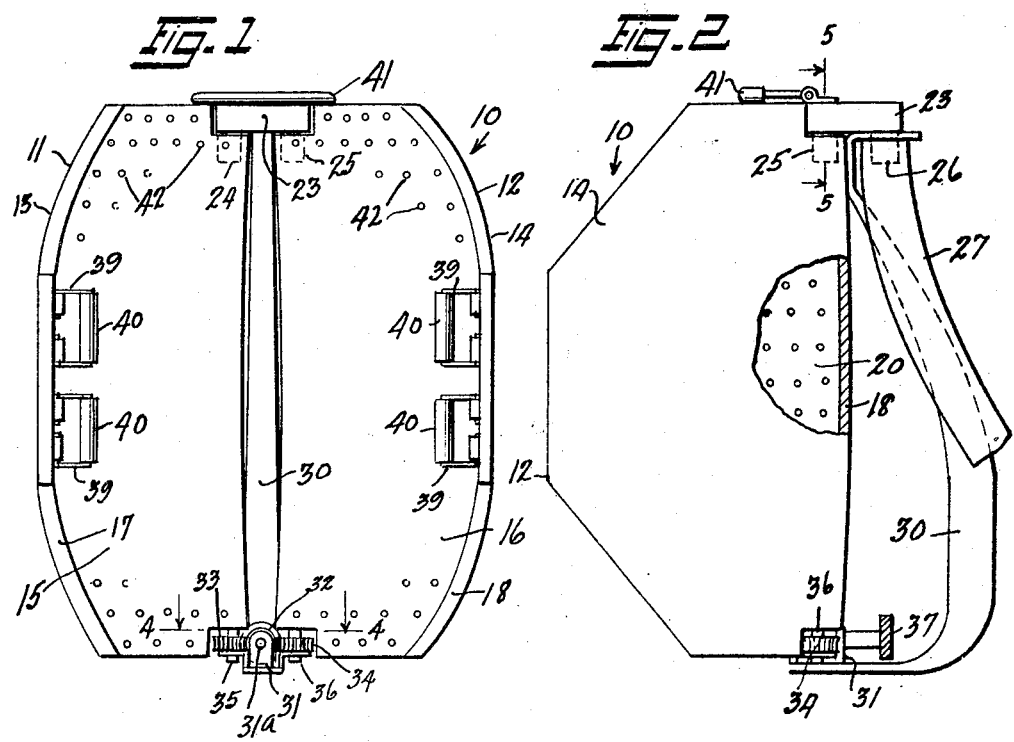
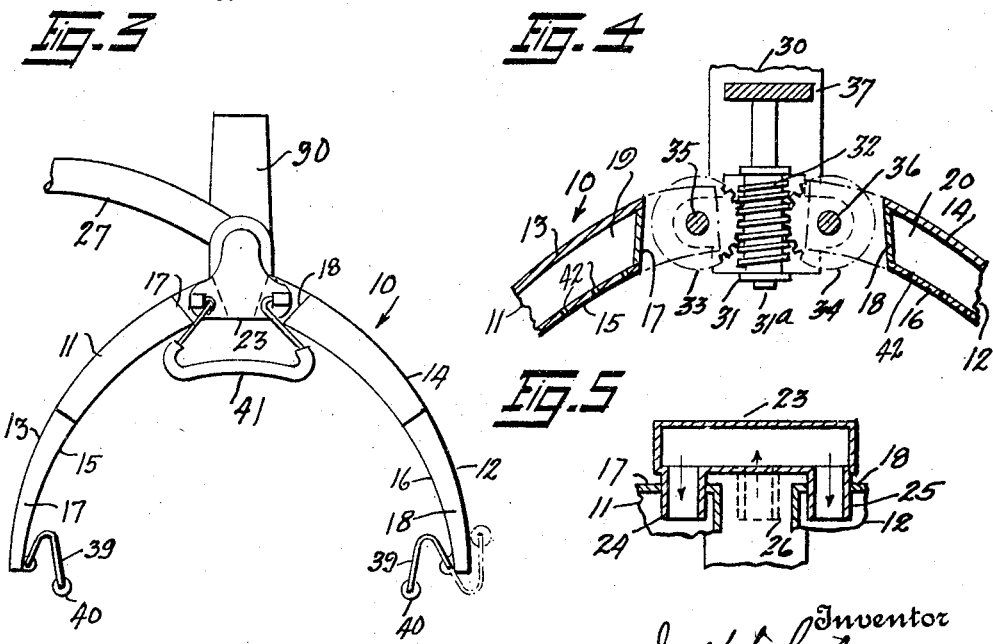
Inventor
Joseph Coletti.
By his Attorney
Maurice Block Patented Mar. 10, 1931

1,795,329

UNITED STATES PATENT OFFICE

JOSEPH COLETTI, OF NEW YORK, N. Y.

FACIAL SPRAY DEVICE

Application filed March 18, 1930. Serial No. 436,666.

This invention relates to spray devices adapted for use for the face or other parts of the body, and has for one of its objects the provision of a device of the character referred to, the use of which will cause perspiration, stimulate blood circulation and thoroughly cleanse the skin.

Another object of the invention is to provide a mask, comprising a pair of hollow shells perforated at their inner surface and pivotally connected to each other, the said mask also being provided with means for admitting free running water and means for swinging the said shells about their pivots so that the mask may be readily used about the face or other part of the body.

A further object of the invention is to provide a device of this nature with means for drawing the skin tight over the area to which it is applied to open the pores so that they may be easily cleansed.

Another object is to produce a device of the character described in which the maximum simplicity of construction and operation is secured.

Other objects and advantages will appear as the nature of the improvements is better understood, the invention consisting substantially in the novel arrangement and co-relation of parts herein fully described, and illustrated in the accompanying drawings, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical expressions, one of which, for the purpose of illustration, is shown in the accompanying drawings, in which Figure 1 is a front view of a spraying device, embodying one form of my invention.

Figure 2 is a side view thereof with a portion of the outer wall of one of the shells broken away.

Figure 3 is a top plan view thereof.

Figure 4 is a sectional view taken on line 4—4 Figure 1, and

Figure 5 is a fragmental sectional view taken on line 5—5 Figure 2.

Referring to the drawings in detail 10 indicates a mask, comprising a pair of hollow shells 11 and 12, the said shells being provided with outer imperforate walls 13 and 14 and inner perforated walls 15 and 16. The said outer and inner walls are joined together at their edges by imperforate plates or walls 17 and 18 to form chambers 19 and 20.

The shells 11 and 12 are pivotally joined at their tops by a hollow member 23, having cylindrical extensions 24 and 25 fitting into openings in the top plates 17 and 18 respectively of the shells 11 and 12. The said hollow member is also provided with a tubular extension 26 to which a rubber hose 27 may be secured, the said hose 27 leading to a suitable source of water supply, such as a hot water faucet or pipe.

A handle 30 is secured at the top thereof to the connecting member 23, and has secured thereto at the bottom thereof a bracket 31, in which is journalled a shaft 31a to which is secured a worm 32 in mesh with a pair of worm wheels 33 and 34 fast to shafts 35 and 36 also journalled in the said bracket 31, and secured to the lower inner ends of the shells 11 and 12 and form the lower pivot posts for the said shells. The said worm 32 may be rotated by a finger piece 37 secured to the shaft 31a.

Each of the shells is provided with a pair of pivotally mounted frames 39 preferably made of resilient wire and have rubber roller sections 40 mounted on them. A rubber covered spacing frame 41 is similarly mounted on the connecting member 23. The frames 39 can be swung out of their normal operative position to the dot and dash position shown in Figure 3.

To use the device, the mask shells are opened up sufficiently to fit over the portion of the body to be treated by turning the thumb or finger piece 37 in clockwise direction, and when sufficiently opened the mask is pushed over the said body portion with the rubber rollers 40 in contact with the skin so as to draw the skin tight and open the pores as wide as possible. When the spacing member comes in contact with the body, the water may then be turned on and it will enter the mask shells through the inlet extensions 24 and 25 and then out through the openings 42 in the inner walls 15 and 16 of the said shells, and strike the face or other body portion with sufficient force to penetrate the pores and thoroughly rinse them. The flow of the water can be kept up as long as necessary. The distance between the inner surface of the mask and the body can be adjusted by swinging the spacer 41 up or down.

From the foregoing it will be seen that I have provided a body spraying device that will stimulate blood circulation and thoroughly cleanse the skin.

Having described my invention, what I claim as new and desire to secure by Letters Patent is:

1. In a device of the nature described, a pair of hollow mask sections, means for admitting liquid into the sections, means for pivotally connecting the said sections and worm and worm wheel operating means for swinging the said sections towards and away from other other.

2. In a device of the nature described, a pair of hollow, perforated mask sections, means for admitting liquid into the sections, a member pivotally connecting the said sections at one end, a handle secured at one end thereof to the said connecting member and extending to the opposite end of the mask section, a worm rotatably supported on the said other end of the handle, a worm wheel in mesh with the worm, the said wheel being rigidly secured to one of the mask sections and rotatably supported in the handle, and means for revolving the worm to swing one of the said mask sections towards and away from the other section.

3. In a device of the nature described, a pair of hollow, perforated mask sections, means for admitting liquid into the sections, a member pivotally connecting the said sections at one end, a handle secured at one end thereof to the said connecting member and extending to the opposite end of the mask section, a worm rotatably supported on the said other end of the handle, a worm wheel rigidly secured to each of the mask sections, in mesh with the worm and rotatably mounted at the said other end of the handle, and a finger piece for revolving the worm to cause the said sections to swing on their pivots.

4. In a device of the nature described, a pair of hollow mask sections, a perforated wall on each of the sections, a hollow member tubular pivots on the said member extending into the mask sections, a handle secured to said member and extending to the opposite end of the mask sections, means in operative engagement with the handle and mask sections at the said opposite end for swinging the said sections towards and away from each other, and means on the connecting member for permitting liquid to enter therethrough to the mask sections.

5. In a device of the nature described, a pair of hollow mask sections, a perforated wall on each of the sections, a hollow member, tubular pivots on the said member extending into the mask sections, a handle secured to said member and extending to the opposite end of the mask sections, a worm, a worm wheel secured to each of the said sections at the said opposite end and in mesh with the worm, the worm and worm wheels being rotatably mounted in the handle extension, means for rotating the worm to swing the mask sections, and a liquid inlet in the connecting member in communication with the tubular pivots.

6. In a device of the nature described, a pair of hollow, perforated mask sections, means for admitting liquid into the sections, means for pivotally connecting the said sections, operating means for swinging the said sections towards and away from each other, and means on the mask sections for drawing the skin tight over a body area when the device is applied thereto.

7. In a device of the nature described, a pair of hollow, perforated mask sections, means for admitting liquid into the sections, and skin tightening means on the said sections.

JOSEPH COLETTI.